March 4, 1969

G. E. Y. HOLMBERG 3,430,885

AUTOMATIC STRAP RETRACTING MECHANISMS
FOR SAFETY SEAT BELTS IN CARS
Filed Oct. 31, 1966

Inventor:
Göte Eskil Yngve Holmberg

By
KARL W. FLOCKS
Attorney

United States Patent Office 3,430,885
Patented Mar. 4, 1969

3,430,885
AUTOMATIC STRAP RETRACTING MECHANISMS FOR SAFETY SEAT BELTS IN CARS
Göte Eskil Yngve Holmberg, Anderstorp, Sweden, assignor to G.E.Y.—Patenter Aktiebolag, Anderstorp, Sweden
Filed Oct. 31, 1966, Ser. No. 590,681
Claims priority, application Sweden, Nov. 15, 1965, 14,700/65
U.S. Cl. 242—107.4
Int. Cl. B65h 75/48
6 Claims

ABSTRACT OF THE DISCLOSURE

In an automatic strap retracting mechanism for safety belts a band roller is provided with locking pins which are held in their retracted inoperative position by a permanent magnet to be forced into operative locking position by the centrifugal force acting on the pins when the belt is suddenly unwound from the roller.

---

A safety seat belt in use should not strap the seat occupant so firmly as to immobilize him. On the contrary he should have sufficient freedom of motion to reach the cubbyhole and controls of the car without having to take off the belt. It is of particular importance that when using the safety seat belt the driver be able to reach the handbrake, because—if the belt cannot be put on before the handbrake has been released—there is the risk of the belt not being used at all. Greater freedom of motion for the seat occupant thus invites to greater frequency of use.

To satisfy the desire for greater freedom of motion in safety seat belts for cars there have already been suggested retracting mechanism for the straps of the safety seat belts, said mechanisms comprising a body with a rotary strap roller mounted therein, a return spring which is put under tension by the unwinding of the strap from the strap roller, and locking means for locking the strap roller against rotation. Various embodiments of this locking means occur, both such as are manually operable and such as are automatically operated in response to an abrupt change of the speed or direction of travel of the car, for instance in the event of a collision. As for automatic retracting mechanisms, i.e., those allowing unimpeded movement of the strap under normal conditions but locking the strap in critical situations—collision or sudden braking—it is imperative that the locking means actually becomes operative with 100% safety locking the strap roller when this is necessary. Swedish authorities responsible for the authorization of safety seat belts and their accessories have not considered the hitherto suggested automatic strap retracting mechanisms reliable in that respect, and no strap retracting mechanisms are known to have been officially approved so far in this country.

The present invention relates to an automatic strap retracting mechanism of the kind referred to in the foregoing, which will satisfy also the most far-reaching requirements for a safe function of the locking means. The characteristic features thereof reside in that the locking means comprises a pin disposed in a bore which opens into the circumferential surface of the strap roller, said pin being axially movable in said bore and kept retracted in the bore by a permanent magnet located at the inner end of said bore, and that the mechanism body is provided immediately outside the circular path described by the mouth of the bore upon rotation of the strap roller with a stationary abutment, whereby said abutment in the direction of rotation of the strap roller to unwind the strap, will engage and lock the pin which has been partly ejected from the bore by inertia or centrifugal force while overcoming the attractive power of the premanent magnet. An automatic strap retracting mechanism of this construction will keep the strap correctly positioned without tightly clamping it across the driver's body and will allow the strap to follow the body as long as the movements thereof are calm and controlled as is usually the case when the driver reaches for some article in the cubbyhole or some of the car controls. Should the movement of the car be abruptly arrested at a collision or sudden braking the locking means immediately becomes operative and efficiently locks the strap against such continued unwinding from the strap retracting mechanism as would prove disastrous.

These and further features of the invention will become more fully apparent from the following description in which reference is made to the accompanying drawing.

Figure 1:
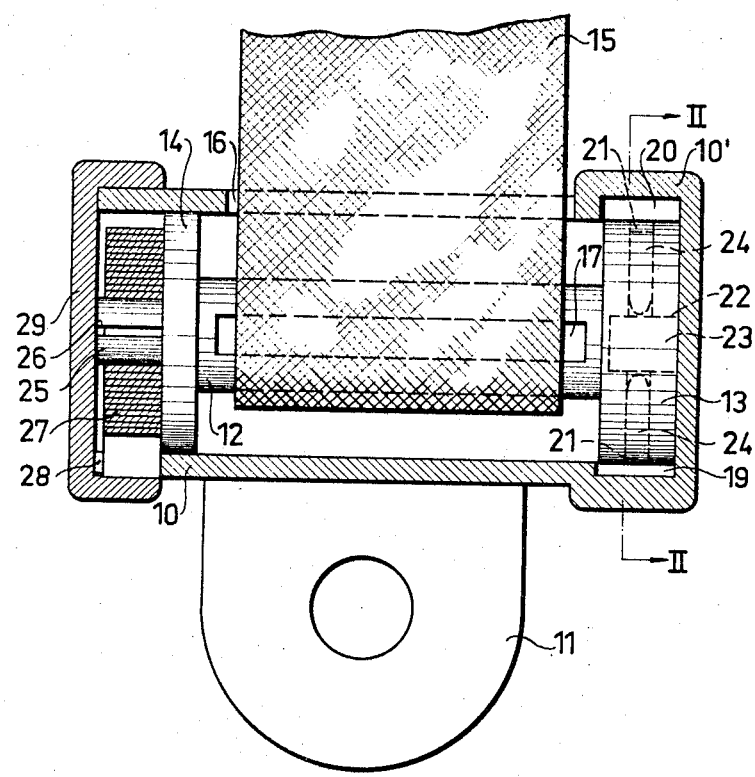
FIGURE 1 is an axial cross-sectional view of an automatic strap retracting mechanism according to the invention fo ra safety seat belt.

The illustrated strap retracting mechanism comprises a body 10 in the form of a cylindrical housing 10' which is open at one end and closed at the other. Said housing can be precision cast and has an external lug 11 to enable anchoring of the housing in a car at one of the anchorage points of a safety seat belt mounted therein. A spool-shaped strap roller 12 having two end flanges 13 and 14 is inserted in the body, and a belt strap 15 passing through a slot 16 in the body is secured in a slot of the strap roller with the aid of a key 17 and can be wound onto the portion of the strap roller situated between the flanges. The end flange 13 of the strap roller 12 is accommodated in a portion 10' of the body at the closed end thereof, said portion having a larger diameter than the remaining body and being provided internally with a series of sawtooth projections 18 (see FIGURE 2) which are integral with the body. Each projection has a radially extending abutment surface 19 and a cam surface 20 which is turned radially inwardly toward the center and is at a successively decreasing distance to the center, clockwise as viewed in FIGURE 2, which is the direction of rotation of the strap roller when the strap 15 is wound onto said roller, as will appear by a comparison with FIGURE 1. The tooth apex, i.e., the place of connection between the abutment surface 19 and the cam surface 20 is at the same diameter as the cylindrical inner side of the body 10.

The end flange 13 has four radially directed bores 21 starting from a central hole 22 which is closed at one end and in which is secured a small cylindrical permanent magnet 23, said bores opening into the circumferential surface of the flange. Axially movably mounted in each bore 21 is a pin 24 of shorter length than the bore and cylindrical over the major part of its length; at the inner end the pin tapers to have a small end surface facing the permanent magnet. The pin is held attracted to the permanent magnet at this end surface so that the pin will occupy the position shown in FIGURE 2, in which it lies altogether inside the bore. The pins 24 and the projections 18 constitute the locking means of the automatic strap retracting mechanism, the function of which is explained below.

Figure 2:
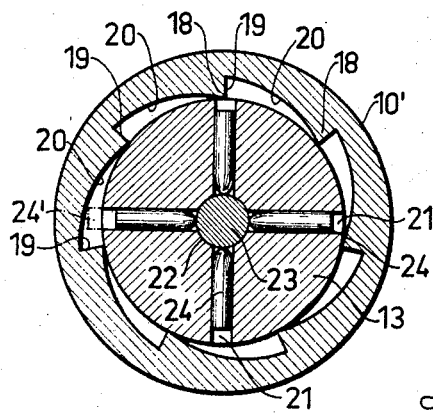
FIGURE 2 is a cross-sectional view of the locking means proper taken on line II—II in FIGURE 1.

The centrally disposed pin 25 projects from the other end flange 14. This pin has an axial slot 26 in which is secured one end of a return coil spring 27 while the other end of said spring is secured in a slot 28 in the body 10. The spring 27 is accommodated in its entirety in the interior of the body, and a cover 29 mounted with press fit on the body 10 maintains both the strap roller 12 and the spring 27 in their correct positions. The return spring is so wound as to be tensioned when the strap 15 is unwound from the strap roller during counterclockwise rotation as viewed in FIGURE 2, while it tends to wind the strap onto the strap roller clockwise as seen in FIGURE 2 when the strap is left to its own devices.

The described automatic retracting mechanism functions as follows. When a pull is effected at the strap 15 in a calm and controlled manner, caused for instance by the seat occupant reaching for something in the car, the strap permits unimpeded withdrawal from the strap retracting mechanism under tensioning of the return spring 27 because nothing prevents the roller from slowly rotating counterclockwise as viewed in FIGURE 2. For the permanent magnet 23 is sufficiently strong to retain the pins 24 in their bores 21 during such slow rotation. At a sudden pull at the strap 15 the attractive power of the permanent magnet will not, however, be sufficient to retain the pins in their bores but one or more pins will be thrown by gravity in a radially outward direction so as to partly project from the associated bores. The pin or each pin will engage the closest abutment surface 19 as seen in the direction of rotation so that the rotation of the strap roller 12 is abruptly stopped, thus preventing a continued unwinding of the strap 15. In FIGURE 2 one pin has been shown by dash and dot lines 24' in its projected position just before it engages the abutment surface 19 immediately ahead of the pin in counter-clockwise direction.

At the relief of the pull exerted at the strap 15 in the unwinding direction the return spring 27 will rotate the strap roller 12 clockwise to wind the strap again onto the strap roller irrespectively of whether or not the locking means has been operative to lock the strap roller. With the pins 24 in their retracted position shown in FIGURE 2, they have no possibility of preventing winding the strap onto the roller by the action of the spring, and if the pins should not already occupy this position due to the locking means having become operative, the pins are cammed into their bores 21 by the cam surface 20 on the projections 18 at the clockwise rotation of the strap roller as viewed in FIGURE 2 so that they are again attracted to the permanent magnet 23. Special adjusting means thus need not be actuated after locking has occurred in order that it shall be possible to wind the strap again onto the strap roller and unwind it therefrom; the only thing to be done is to slacken the strap slightly.

When the belt is taken off the strap is automatically wound by the return spring 27 into the automatic strap retracting mechanism. This will prevent dirtying the strap inasmuch as it does not any more lie about on the floor of the car, and at the same time it is within easy reach when the safety seat belt is put on. Winding of the strap onto the strap roller can be effected at any speed whatever within the capacity of the return spring. The locking means cannot thereby become operative. Putting on the safety seat belt under withdrawal of the strap from the strap retracting mechanism can take place unimpeded by the locking means provided that it is put on with controlled motions without any abrupt jerks. With the safety seat belt in position the driver has full freedom of motion with regard to calm and controlled motions and also complete safety that the strap is locked against withdrawal at the abrupt jerk at the strap, that nearly always occurs at a collision or sudden braking. It should be stressed particularly that the pins 24 need not all engage the projections 18 to provide locking. Theoretically, but one pin need be engaged provided it is sufficiently strong to take up the prevailing load. Moreover, when three or more bores 21 with associated pins 24 are provided one can always count on at least one bore being directed forwards in the direction of travel of the car (provided the axis of rotation of the strap roller is transverse to the vehicle) so that the pin in this bore at an abrupt retardation of the car is thrown out of the bore by its energy of motion before the strap roller has had time to rotate by reason of a jerk at the strap. Therefore there is but an insignificant risk that the locking means will not correctly fulfill its function, and naturally the safety can be further increased by the provision of further bores and associated pins in addition to the four pins illustrated. Should the permanent magnet 23 lose its magnetic force—with the permanent magnet material used at present, this risk is extremely slight; there are permanent magnet materials guaranteed to retain their magnetic force for at least 15 years—this will not jeopardize the locking in a critical situation but on the other hand result in the disadvantage that the strap roller is locked also at the slowest rotation: a reliable reminder that the strap retracting mechanism should be replaced. For the rest it is possible to check at any time by pulling at the strap that the strap retracting mechanism is in good working order.

It is readily understood by those skilled in the art that the embodiment described above and shown in the drawing can be modified within the scope of the appended claims even though said embodiment at present is regarded as the best and as that to be preferred from the point of manufacture and function. For example, the series of sawtooth projections 18 can be replaced by elongated openings provided in the shell of the body 10 and having the outer ends closed by a ring or a cover, the pins 24 engaging in said openings to bring about locking. The radial bores 21 for the pins can naturally be provided in a direction more or less deviating from the radial direction, and the locking means can of course be disposed in a portion separate from the strap roller proper, said portion being, however, arranged to positively follow the rotation of the strap roller for instance by said portion being connected to the strap roller over a gearing, which will, however, make for a more complicated and expensive construction. Each separate portion positively rotating with the strap roller should therefore be regarded equivalent to the strap roller proper or to an element integral therewith.

What I claim and desire to secure by Letters Patent is:

1. An automatic strap retracting mechanism for safety seat belts in cars comprising a body to be mounted in the car, a rotary strap roller rotatably mounted in said body, said roller forming at least one bore opening into the circumferential surface of the roller, spring means acting between said body and said roller to be put under tension when said roller is rotated in one direction, a locking pin in said bore, said pin being axially movable in said bore, a permanent magnet located at the inner end of said bore and keeping said pin magnetically retracted in said bore, and a stationary abutment in said body immediately outside the circular path described by the mouth of said bore upon rotation of the roller, said abutment being arranged to be engaged, when said roller is rotated in said one direction, by said pin when partly ejected from said bore by forces acting on said pin against the attractive power of the permanent magnet.

2. An automatic strap retracting mechanism in accordance with claim 1, wherein said roller forms several bores extending substantially radially and each having one pin received therein, and said permanent magnet common to all said pins is mounted centrally in said roller.

3. An automatic strap retracting mechanism in accordance with claim 2, wherein said permanent magnet extends coaxially in said roller.

4. An automatic strap retracting mechanism in accordance with claim 3, wherein each said pin forms a tapering end facing said magnet to present thereto an attraction surface reduced relative to the remaining cross-section of said pin.

5. An automatic strap retracting mechanism in accordance with claim 1, wherein said abutment comprises at least one sawtooth formation including an abrupt abutment surface and a radially inwardly facing cam surface of successively decreasing distance to the center of said roller in a peripheral direction opposite said one direction, the point of connection between said abutment surface and said cam surface forming a tooth apex disposed close to said circular path of motion.

6. An automatic strap retracting mechanism in accordance with claim 5, wherein said body comprises a sleeve closed at one end and open at the other end, said roller being inserted therein from said other end, and a cover closing said other end, said tooth apex lying substantially flush with the internal circumferential surface of said sleeve, and wherein said roller forms two end flanges and is rotatably mounted in the interior of said sleeve by means of such flanges.

References Cited

UNITED STATES PATENTS

| | | | |
|---|---|---|---|
| 575,572 | 1/1897 | Parsons | 160—296 |
| 2,105,469 | 1/1938 | Bosch | 242—107.7 |
| 2,701,693 | 2/1955 | Nordmark et al. | 242—107.4 |
| 2,732,149 | 1/1956 | Whittingham et al. | 242—107.4 |
| 2,953,315 | 9/1960 | Lautier et al. | 242—107.4 |
| 3,058,687 | 10/1962 | Bentley | 242—107.4 |
| 3,081,044 | 3/1963 | Keith | 242—18 |

WILLIAM S. BURDEN, *Primary Examiner.*